United States Patent

Mimura

[11] 3,981,591
[45] Sept. 21, 1976

[54] AUTOMATIC PHOTOMETER

[75] Inventor: Kazuo Mimura, Yokohama, Japan
[73] Assignee: Nippon Kogaku K.K., Tokyo, Japan
[22] Filed: Feb. 27, 1975
[21] Appl. No.: 553,808

Related U.S. Application Data

[63] Continuation-in-part of Ser. No. 392,862, Aug. 30, 1973, abandoned.

[30] Foreign Application Priority Data

Sept. 4, 1972 Japan............................. 47-87929

[52] U.S. Cl................................ 356/201; 250/206; 356/225; 356/226
[51] Int. Cl.² ........................................ G01N 21/22
[58] Field of Search............. 350/81; 356/201–206, 356/222, 225, 226; 250/200, 201, 206, 215, 216, 561

[56] References Cited
UNITED STATES PATENTS

3,711,209   1/1973   Caspersson et al.................. 356/203

*Primary Examiner*—John K. Corbin
*Assistant Examiner*—F. L. Evans
*Attorney, Agent, or Firm*—Fitzpatrick, Cella, Harper & Scinto

[57] ABSTRACT

In an automatic photometer for metering light from a sample to be measured which includes a light source for illuminating the sample and an objective for focusing the light passed from the light source through the sample, a slit is positioned closely adjacent the focal plane of the objective and has an opening providing a central area and an outer area surrounding the central area. Two light receiving elements are disposed to receive the light passed through the central and outer areas of the slit, respectively, and means are provided for effecting photometry under selected conditions of light reception by the light receiving elements.

11 Claims, 14 Drawing Figures

DISTANCE OF TRAVEL OF OBJECT

AUTOMATIC PHOTOMETER

Cross-Reference to Related Application

This is a continuation-in-part of my copending application Ser. No. 392,862, filed Aug. 30, 1973, for AUTOMATIC PHOTOMETER, now abandoned.

BACKGROUND OF THE INVENTION

1. Field of the Invention

This invention relates to an automatic photometer for metering light, such as transmitted light, reflected light, fluorescence or phosphorescence, from a sample to be measured.

2. Description of the Prior Art

A prior art photometer has employed an optical system as shown in FIG. 1 of the accompanying drawings. In such optical system, a light source 1 illuminates a sample 2 whose image is focused through an objective 3 onto a stop plate 4. Upon illumination from the light source 1, the sample 2 also provides a background having a certain intensity of brightness in itself. Further, the sample has a portion 2a to be measured as bright as the background itself, a portion 2b to be measured brighter than the portion 2a, and a portion 2c to be measured still brighter than the portion 2b (see FIG. 2). A light receiving element 5 is arranged to receive only that part of the light which has been passed through an opening 4' in the stop plate 4.

With such arrangement, the light from the sample portion 2b can be fully received by the light receiving element 5 to measure the entire portion 2b when the image 2'b of such portion is wholly contained within the opening 4' of the stop plate 4 in the manner as shown in FIG. 3a. In the position as shown in FIG. 3b or 3c, however, the image 2'b or 2'c of the sample portion 2b or 2c is not wholly contained within the opening 4' of the stop plate with the result that light from only a part of the image 2'b or 2'c is received for photometry by the light receiving element, thus providing an erroneous photometric indication. In other words, accurate photometry cannot be achieved unless the operator confirms at each test whether the image of the sample is completely aligned with the opening 4' of the stop plate. Thus, the prior art photometer could not accomplish automatic photometry.

SUMMARY OF THE INVENTION

Thus, by the present invention, I contribute an automatic photometer which overcomes the above-noted difficulties and disadvantages and which is capable of automatically metering the light from a sample to be measured.

My automatic photometer for metering light from a sample to be measured comprises a light source for illuminating the sample to be measured, an objective for focusing the light passed from the light source through the sample, light blocking means having at least two areas permitting light passage therethrough, light receiving elements disposed to receive the light passed through the areas of the light blocking means, respectively, and means for effecting photometry under selected conditions of light reception by the light receiving elements.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

Specific embodiments of the invention have been chosen for purposes of illustration and description, and are shown in the accompanying drawings, forming a part of the specification wherein:

FIGS. 1 to 3 are views of the prior art photometer, FIG. 1 schematically showing the optical system employed therein, FIG. 2 being a plan view of a sample to be measured, and FIGS. 3a, 3b and 3c illustrating the photometry effected by such prior art photometer;

FIGS. 4 to 7 refer to an embodiment of the present invention, FIG. 4 being a plan view of the stop plate, FIGS. 5a and 5b illustrating the photometry effected by such embodiment, FIG. 6 showing a first embodiment of the present invention, and FIG. 7 being a graph illustrating the output curves;

DESCRIPTION OF THE PREFERRED EMBODIMENTS

Figure 1:
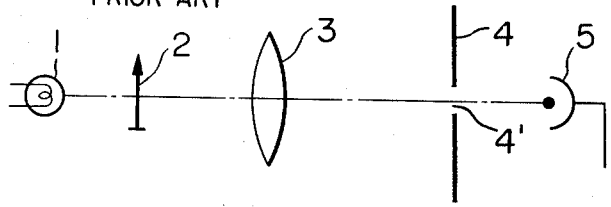
Figure 2:
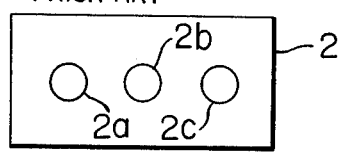
Figure 3A:
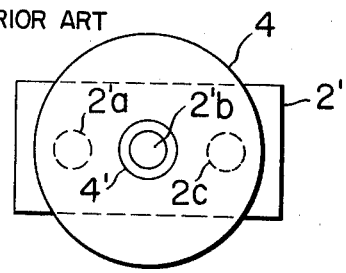
Figure 3B:
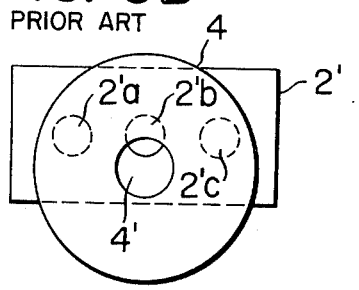
Figure 3C:
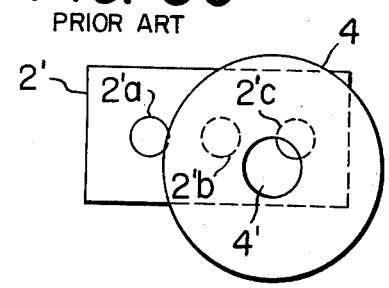
Figure 4:
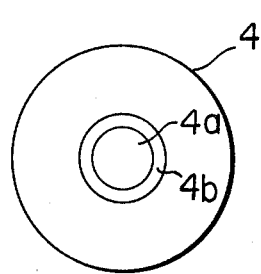
Figure 5A:
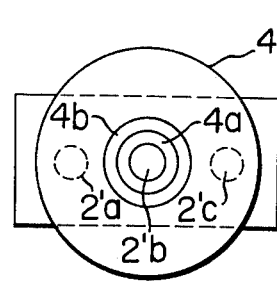
Figure 5B:
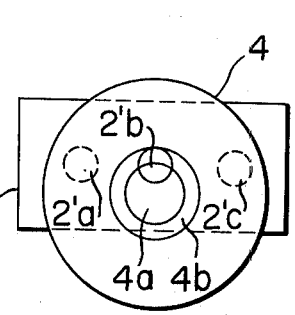
Figure 6:
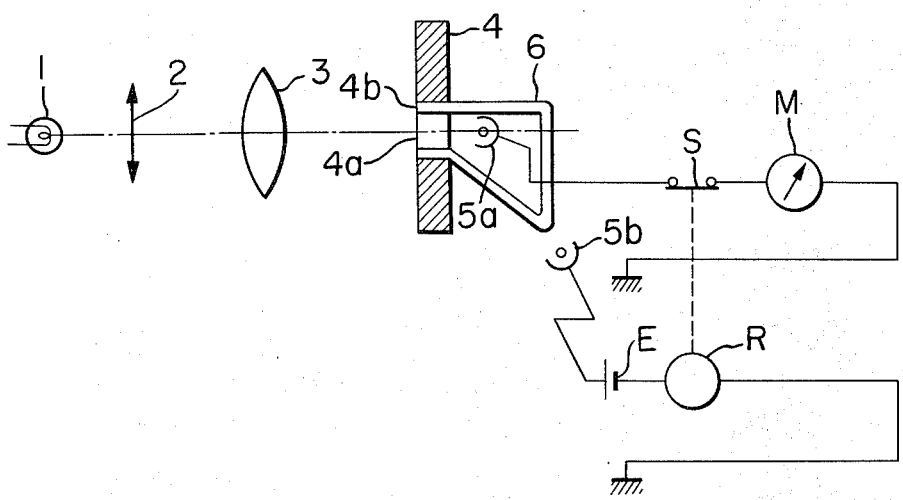

Referring first to FIGS. 4 to 7, there is shown a first embodiment of the present invention. In FIG. 6, reference numerals 1 and 2 designate a light source and a sample to be measured, respectively. The optical arrangement shown there is designed such that the sample 2 is illuminated by the light source 1 and the image thereof is focused through an objective 3 onto a stop plate 4. As shown in FIG. 4, stop plate 4 has therein two light passing areas, a central area 4a and an outer area 4b surrounding the central area. The light passed through the area 4a is received by a light receiving element 5a while the light passed through the area 4b is received by another light receiving element 5b. A battery E is provided which is equal in value but opposite in polarity to an electrical signal appearing at the output of the light receiving element 5b when the image 2'a, 2'b or 2'c of the sample portion 2a, 2b or 2c is not wholly contained within the outer area 4b, i.e. when the light receiving element 5b for receiving the light passed through the outer area 4b receives an intensity of light corresponding to the background provided by the sample 2. An electromagnet R and a switch S together constitute a relay and are designed such that the switch S is opened upon a current flowing through the electromagnet R. A meter M electrically indicates the intensity of the light from the central area 4a which is received by the light receiving element 5b.

Referring not to FIGS. 5a, 5b and 6, description will be made of operation of the first embodiment of my invention. Whenever the image 2'b of the sample portion 2b is wholly contained within the central area 4a as shown in FIG. 5a, the light receiving element 5b for the outer area 4b of the stop plate 4 is receiving only an intensity of light corresponding to that of the background so that the electrical value of the electrical signal appearing at the output of the light receiving element 5b is equal in value but opposite in polarity to that of the battery E and thus, these two electrical values negate each other to prevent any current from flowing through the closed circuit formed by the battery E, electromagnet R and light receiving element 5b. As a result, the elecromagnet R is unenergized to maintain the switch S in closed position, whereby the indicator meter M indicates a measured intensity of the light from the image 2'b of the sample portion 2b which is then wholly contained within the central area 4a of the stop plate 4.

Whenever the image 2'b of the sample portion 2b is not wholly contained within the central area 4a in the manner as shown in FIG. 5b, the electrical value of the signal appearing at the output of the light receiving element 5b is increased to permit a current to flow through the closed circuit including the element 5b, battery E and electromagnet R. As a result, the electromagnet R is energized to open the switch S, which in turn opens the closed circuits 5a – S – M to prevent the indicator M from effecting photometry.

Thus, according to the first embodiment of the present invention as shown in FIG. 6, automatic photometry can take place only when the image 2'a, 2'b or 2'c of the sample portion 2a, 2b or 2c of the sample 2 to be measured is wholly contained within the central area 4a of the stop plate 4.

Figure 7:
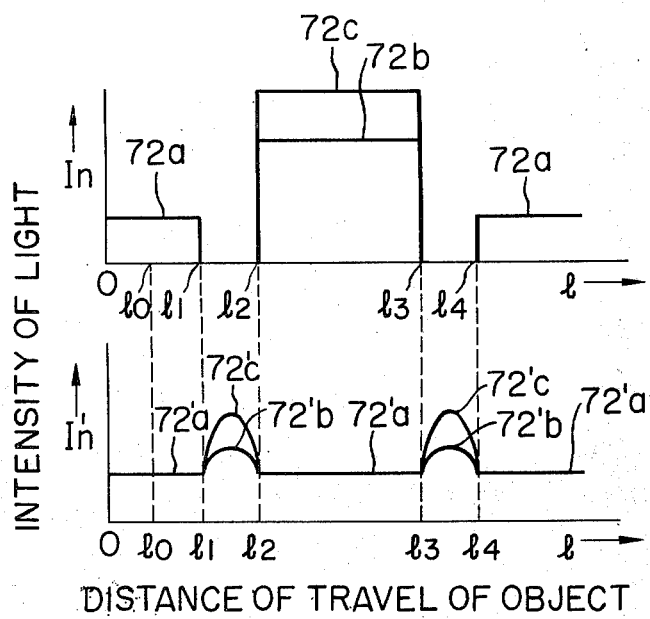

FIG. 7 graphically illustrates the relationships between the distance of travel of the sample to be measured and the intensities of light received by the light receiving elements 5a and 5b. In the graph, the abscissa represents the distance of travel $l$ and the ordinate represents the intensities of light In and In' received by the light receiving elements 5a and 5b, respectively. The distance $l0$ corresponds to the position in which photometry is effected for the background or the sample portion 2a of the sample 2, and in this position there is no current flowing through the closed circuit E – R – 5b with the switch S closed, whereby outputs $7^{2a}$ and $7^{2'a}$ are obtained from the light receiving elements 5a and 5b, respectively. The distance range from $l1$ to $l2$ corresponds to the position in which part of the images 2'b or 2'c of the sample portion 2b or 2c is contained within the outer area 4 of the stop plate 4, and in this position the light receiving element 5b receives a correspondingly increased intensity of light. At this time, an output $7^{2'b}$ or $7^{2'c}$ is obtained from the element 5b. At the same time, a current flows through the closed circuit E – R – 5b to open the switch S, thus disabling the indicator meter M to effect photometry with zero output of the light receiving element 5a.

The distance range from $l2$ to $l3$ corresponds to a position in which the image 2'b or 2'c of the sample portion 2b or 2c is wholly contained within the central area 4a of the stop plate 4, and in this position the output signal of the light receiving element 5b assumes the steady state as designated by $7^{2a}$. At the same time, there is no current flowing through the closed circuit E – R – 5b with the switch S closed, thereby permitting the indicator meter M to effect photometry. In this case, the light receiving element 5a produces an output $7^{2b}$ or $7^{2c}$.

The distance range from $l3$ to $l4$ provides the same condition as that for $l1$ to $l2$. In this condition, the output of the light receiving element 5a is zero and no photometry is occurring for the sample portion 2b or 2c.

The distance range $l4$ to $l$ exhibits the same condition as that for $l0$ to $l1$, wherein photometry is occurring for the background or the sample portion 2a.

From FIG. 7 it is possible to represent the levels of the sample portions 2a, 2b and 2c as the result of automatic photometry. Here, assuming that the images 2'b and 2'c are equal in size, it will be seen from FIG. 7 that the number of the sample portions 2b and of the sample portions 2c in a certain area can be counted by suitably selecting the diameter of the area 4a, say, to a value slightly smaller than double the diameter of the image 2'b or 2'c and also suitably selecting the pitch, say, to a value substantially equal to the diameter of the image 2'b or 2'c, and by scanning them over a plane.

The arrangement described above has been designed such that the intensity of light received by the light receiving element 5a is measured by the meter M only when the image 2'a, 2'b or 2'c of the sample portion 2a, 2b or 2c is wholly contained within the central area 4a of the stop plate 4, whereas, the same effect as that described above may be achieved as well by having the data of both light receiving elements 5a and 5b recorded at all times and reading out the data of the element 5a only when the output of the element 5b is the level of $7^{2'a}$ as shown in FIG. 7.

Figure 8:
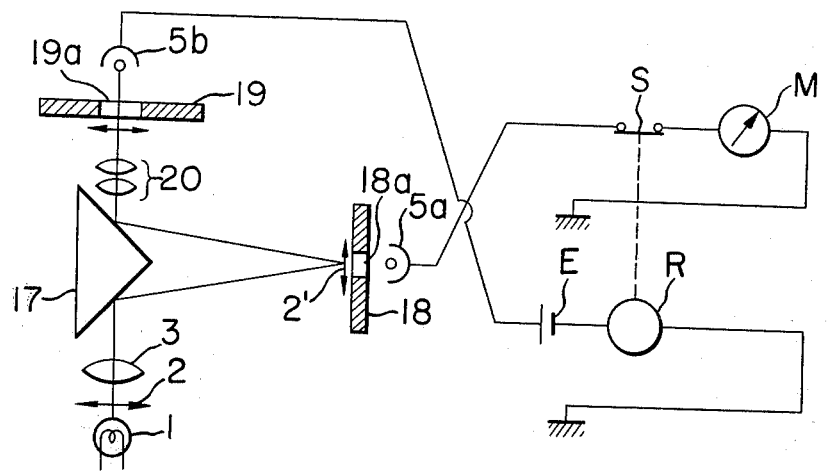
FIG. 8 illustrates schematically a second embodiment of the present invention.

FIG. 8 illustrates a second embodiment of the present invention which differs from the embodiment of FIG. 6 in that two areas are provided in two distinct image forming planes, respectively. The light source 1, sample 2, objective 3 and light receiving elements 5a and 5b are all constructed similarly to those described with respect to FIG. 6. However, the optical system in this embodiment includes a prism 17 and a first stop plate 18 formed with a light passing opening 18a arranged such that the image 2' of the sample 2 is focused at the first plate 18. The light passed through the opening 18a of the plate is led to the light receiving element 5a, while the remaining area 18b of the first slit 18, other than the opening 18a, is formed as a total reflection mirror so that all the light impinging on such area is reflected so as to pass through a set of relay lenses 20 and be focused on a second stop plate 19 having an opening 19a of greater diameter than that of the opening 18a of the first plate 18. With this arrangement, whenever the image of the sample portion 2a, 2b or 2c of different brightnesses is wholly contained within the opening 18a of the first plate 18, the image of the sample portion 2a, 2b or 2c is not focused at the second plate 19 so that the light receiving element 5b provides a steady condition as described with respect to the first embodiment of FIG. 6 and there is no current flowing through the closed circuit 5b – E – R with the switch closed, while the light is received by the light receiving element 5a and measured by the meter M. Whenever any of the described images is not wholly contained within the opening 18a, all or part of the light which is beyond the opening 18a is focused at the second plate 19 thereby to increase the intensity of the light receiving element 5b. As a result, a current flows through the closed circuit E – R – 5b to energize the electromagnet R, which thus opens the switch S to prevent photometry of the sample portions.

Figure 9:
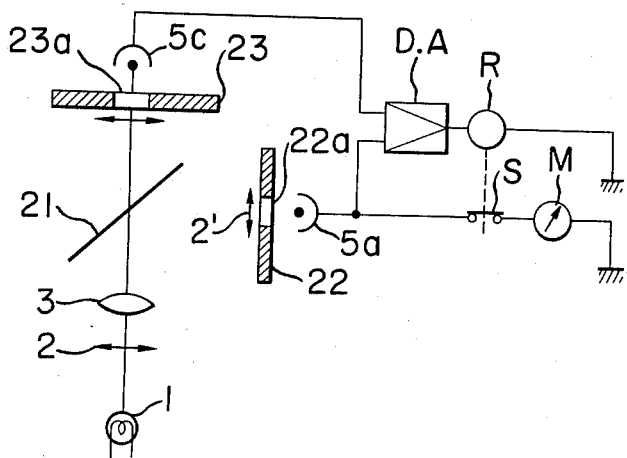
FIG. 9 illustrates schematically a third embodiment of the present invention.

FIG. 9 illustrates a third embodiment of the present invention which employs a beam splitter 21 to form images at two points. A first stop plate 22 has an opening 22a through which light is passed to the light receiving element 5a. A second stop plate 23 has an opening 23a through which light is passed to the light receiving element 5c. The opening 23a has a greater diameter than that of the opening 22a. A differential amplifier DA is provided to receive as input the outputs from the light receiving elements 5a and 5c. The electromagnet R and switch S together constitute a relay and are designed such that the switch S is opened upon energization of the electromagnet R. M is an indicator meter for indicating the output of the light receiving element 5a.

Whenever the image of the sample is wholly contained only within the central area 22a which corresponds to the central area 4a or 18a shown in FIGS. 6 or 8, the two light receiving elements 5a and 5c produce outputs of equal magnitude which are applied as input to the differential amplifier DA, which in turn produces no output, so that the electromagnet R remains unenergized to maintain the switch S closed, thus permitting the output of the light receiving element 5a to be indicated by the indicator meter M.

Whenever the image of the sample is not wholly contained within the central area 22a, the light receiving element 5c produces a greater output than that produced by the element 5a and such output difference results in a corresponding output of the differential amplifier DA. However, since the electromagnet R is being energized to open the switch S, the indicator meter M cannot indicate the output of the light receiving element 5a.

Figure 10:
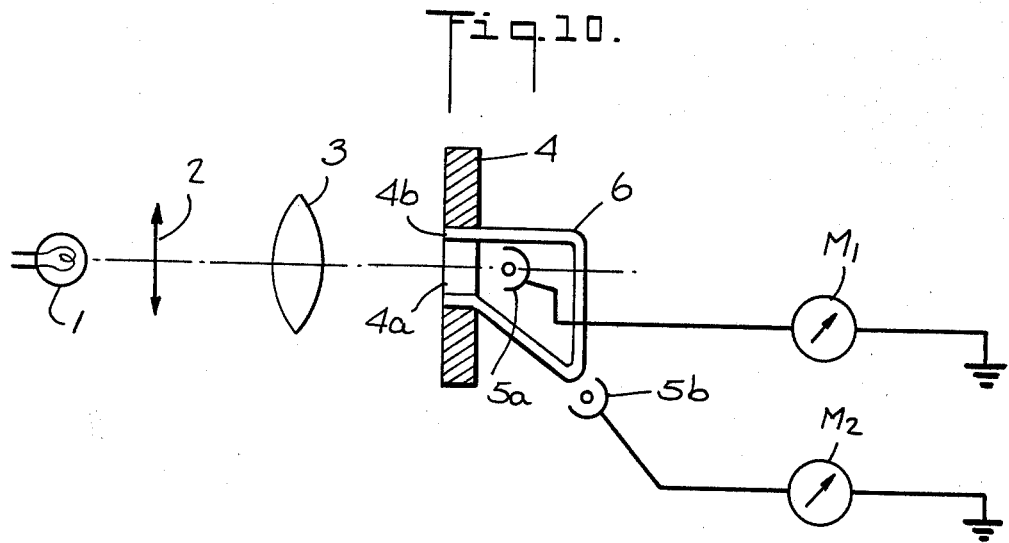
FIG. 10 illustrates schematically a further embodiment of the present invention.

Referring now to FIG. 10, the light source 1, sample 2, objective 3, stop plate 4 with central area 4a and outer or peripheral area 4b, and light receiving elements 5a and 5b are constructed similarly to those of FIG. 6. However, light receiving element 5a is connected to one terminal of a first indicating means M1, the opposite terminal of which is grounded; and light receiving element 5b is connected to one terminal of a second indicating means M2, the opposite terminal of which is grounded. It will be seen that, according to this construction, the first indicating means M1 continuously displays an output of the first light receiving element 5a even when an image of a portion of a sample to be measured is not completely within the aperture 4a of the stop plate 4, as shown in the upper portion of the graph of FIG. 11.

Figure 11:
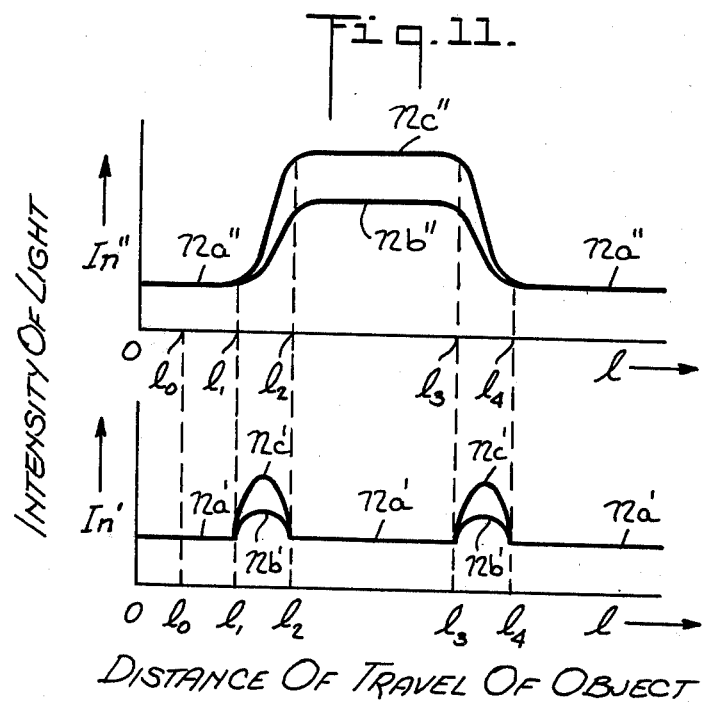
FIG. 11 is a graph illustrating output curves applicable to the embodiment of FIG. 10.

The second indicating means M2 displays an output of the second light receiving element 5b, as shown in the lower portion of the graph of FIG. 11. Thus, portion 72c'' or 72b'', which corresponds to a state in which the portion of the sample image to be measured is completely within the aperture 4a of stop plate 4, may be determined by observing the data displayed by both indicating means M1 and M2, the latter indicating means M2 serving as discriminating means for the system. It will be appreciated by those persons skilled in the art that the arrangement of first and second indicating means described in connection with the embodiment of FIG. 10, can as readily be employed with those embodiments described in connections with FIGS. 8 and 9.

From the foregoing description of the present invention wherein a surface disposed closely adjacent the formed real image of a sample to be measured is divided into a central area and outer area surrounding the central area so that light from the central area may be received by a light receiving element only when the image of the sample is wholly contained within the central area, it will be seen that photometry can be effected without the need to confirm every time whether the images of the portions of the sample to be measured are completely contained within the opening of the stop plate, unlike the prior art device. In addition, by moving the sample in a plane perpendicular to the optical axis, the number of the portions of the sample to be measured which are different in brightness, can be counted.

I believe that the construction and operation of my novel automatic photometer will be understood, and that the advantages thereof will be fully appreciated by those persons skilled in the art.

I claim:

1. An automatic photometer for metering intensity of light from a portion of a sample to be measured, said photometer comprising a light source for illuminating the sample,
    an objective for forming the image of the sample illuminated by the light source,
    a stop plate formed with an aperture at the focusing plane of the objective for passing light therethrough,
    a first photo-electric conversion means for receiving the light passed through the aperture of said stop means,
    means for indicating an output signal from said first photo-electric conversion means, and
    control means for allowing the indicating of said indicating means, only when the image of said portion of the sample to be measured is completely within said aperture,
    whereby said indicating means indicates only the output signal from said first photo-electric conversion means when the image of said portion to be measured is completely within said aperture.

2. Automatic photometer according to claim 1, wherein said control means comprises a peripheral aperture formed at the periphery of said aperture of said stop plate, second photo-electric conversion means, photoconductive means for transmitting the light incident on the peripheral aperture to said second photo-electric conversion means, and
    a control circuit for blocking the indication of said indicating means by the output signal from said second photo-electric conversion means, only when a part of said portion to be measured is within said peripheral aperture.

3. Automatic photometer according to claim 2, wherein said control means comprises:
    a switch connected between said first photo-electric conversion means and said indicating means,
    an electro-magnet connected to said switch so that said switch is opened when the electro-magnet is energized, and
    a source for energizing said electro-magnet, only when a part of the image of said portion to be measured is within said peripheral aperture.

4. Automatic photometer according to claim 1, wherein said stop plate has a total reflection surface in its entirety except said aperture,
    said control means includes an optical member provided with a first reflection surface by which the image forming light from the objective is reflected to be incident on said stop plate obliquely and with a second reflection surface by which the light reflected by said total reflection surface is reflected; an auxiliary stop plate provided on the optical axis of the light reflected by said optical member and at the conjugate position with said stop plate, said auxiliary stop plate formed with an aperture which is larger then the aperture of said stop plate; a second photo-electric conversion means for receiving the light passed through the aperture of said auxiliary stop plate; and a control circuit for preventing the indication of said indicating means, only when a part of the image to be measured is reflected by said total reflection surface and by the second reflection surface of said optical member to be incident on the aperture of said auxiliary stop plate.

5. Automatic photometer according to claim 4, wherein said control circuit includes a switch connected between said first photo-electric conversion means and said indicating means, an electro-magnet connected to said switch so that said switch is opened when said electro-magnet is energized; and a source for energizing said electro-magnet only when a part of the image of said portion to be measured is within said aperture of said auxiliary stop plate.

6. Automatic photometer according to claim 1, wherein said control means includes a semi-transparent mirror for reflecting the light passed through said objective toward said stop plate; an auxiliary stop plate formed with an aperture larger than the aperture of said stop plate, so as to pass therethrough the light from the objective, said auxiliary stop plate being so arranged that the light passed through said semi-transparent mirror may form on said auxiliary stop plate an image which has the same size as the image formed on said stop plate; a second photo-electric conversion means for receiving the light passed through the aperture of said auxiliary stop plate; and a control circuit for allowing the indication of said indicating means only when the image of said portion to be measured is completely within the aperture of said stop plate.

7. Automatic photometer according to claim 6, wherein said control means includes a switch connected between said first photo-electric conversion means and said indicating means; an electro-magnet connected to said switch so that said switch is opened when the electro-magnet is energized; and an operational amplifier the inputs of which are respectively connected to the outputs of said first and second photo-electric conversion means and the output of which is connected to said electro-magnet, said operational amplifier producing an output signal except when the image of the portion to be measured is completely within the aperture of said stop plate, whereby said control means allows the indication of said indicating means, only when the image of the portion to be measured is completely within the aperture of said stop plate.

8. An automatic photometer for metering intensity of light from a portion of a sample to be measured, comprising;
a light source for illuminating the sample,
an objective for forming an image of the sample illuminated by said light source,
a stop plate provided at the image forming plane of said objective, the stop plate formed with an aperture for passing the light therethrough,
first photo-electric conversion means for receiving the light passed through the aperture of said stop plate;
indicating means for indicating the output signal from said first photo-electric conversion means; and discriminating means for detecting and indicating a signal for discriminating whether or not the image of said portion to be measured is completely within the aperture of said stop plate,
whereby an output signal from said first photoelectric conversion means produced only when the image of said portion to be measured is completely within the aperture of said stop plate is determined by the indication of said discriminating means.

9. Automatic photometer according to claim 8, wherein said discriminating means includes a peripheral aperture formed at the periphery of the aperture of said stop plate; second photo-electric conversion means; photo-conductive means transmitting the light incident on said peripheral aperture to said second photo-electric conversion means; and second indicating means indicating an output signal from said second photo-electric conversion means.

10. Automatic photometer according to claim 8, wherein said stop plate has a total reflection surface in its entirety except on said aperture; and said discriminating means includes an optical member formed with a first reflection surface which reflects the image forming light from said objective to be incident obliquely on said stop plate and with a second reflection surface which reflects the light reflected by the total reflection surface of said stop plate; an auxiliary stop plate provided on the optical axis of the reflected light from said optical member and at a conjugate position with said stop plate, said auxiliary stop plate formed with an aperture larger than the aperture of said stop plate through which the light from the optical member is allowed to pass;
second photo-electric conversion means for receiving the light passed through the aperture of said auxiliary stop plate; and second indicating means for indicating an output signal from said second photo-electric conversion means.

11. Automatic photometer according to claim 8, wherein said discriminating means includes a semi-transparent mirror for reflecting the light from said objective toward said stop plate; an auxiliary stop plate on which an image having the same size as that formed on said stop plate is formed through the semi-transparent mirror, said auxiliary stop plate formed with an aperture for passing the light therethrough, the aperture being larger than that of said stop plate; second photo-electric conversion means for receiving the light passed through the aperture of said auxiliary stop plate; and second indicating means for indicating an output signal from said second photo-electric conversion means.

* * * * *